United States Patent [19]

Richter et al.

[11] Patent Number: 5,718,866
[45] Date of Patent: Feb. 17, 1998

[54] PROCESS FOR PRODUCING REFRACTORY MATERIALS

[75] Inventors: Hans-Jürgen Richter; Reiner Schober; Gerhard Putzky, all of Dresden; Gert König, Neukirchen-Vluyn, all of Germany

[73] Assignee: Dolomitwerke GmbH, Wülfrath, Germany

[21] Appl. No.: 613,011

[22] Filed: Mar. 8, 1996

[30] Foreign Application Priority Data

Sep. 9, 1993 [DE] Germany ............... 43 30 584.9

[51] Int. Cl.$^6$ .................................... C04B 35/599
[52] U.S. Cl. ................ 264/647; 264/666; 264/676
[58] Field of Search ............... 264/60, 65, 647, 264/666, 676

[56] References Cited

U.S. PATENT DOCUMENTS

| | | | |
|---|---|---|---|
| 3,960,581 | 6/1976 | Cutler | 264/65 |
| 3,991,166 | 11/1976 | Jack | 264/65 |
| 4,243,621 | 1/1981 | Mori et al. | 264/65 |
| 4,578,363 | 3/1986 | Campos-Loriz . | |
| 5,212,123 | 5/1993 | Schoennahl . | |

FOREIGN PATENT DOCUMENTS

| | | |
|---|---|---|
| 0153000 | 8/1985 | European Pat. Off. . |
| 0242849 | 10/1987 | European Pat. Off. . |
| 0482984 | 4/1992 | European Pat. Off. . |
| 2300547 | 7/1973 | Germany . |
| 2805292 | 3/1979 | Germany . |
| 4109375 | 9/1992 | Germany . |
| 2006371 | 1/1990 | Japan . |

OTHER PUBLICATIONS

Abstract of DE 4109375.
"In-situ Formation of Sialons in Refractories Containing Silicon Carbide", British Ceramic Transactions and Journal, vol. 88, No. 5, 1989, Morrison, et al., pp. 157–161.

Primary Examiner—James Derrington
Attorney, Agent, or Firm—Nils H. Ljungman and Associates

[57] ABSTRACT

A process for the production of refractory materials containing SiALON and carbon or SiALON/SiC and carbon. The process for producing a refractory material containing SiALON and carbon includes heating a molding containing silicon, aluminum, aluminum oxide and carbon to a temperature of 1380° C. at a total atmospheric pressure of less than or equal to 0.1 MPa in an atmosphere containing predominantly nitrogen and containing a concentration of 0 to 5 vol. % of carbon monoxide, subsequently increasing the concentration of carbon monoxide to between 10 and 30 vol. % and heating the molding to a temperature of 1500° C. at a total atmospheric pressure of less than or equal to 0.1 MPa; and subsequently controlling the concentration of carbon monoxide to be between 0 and 10 vol. % and heating the molding to a temperature of 2200° C. at a total atmospheric pressure of greater than or equal to 0.1 MPa. The process for producing a refractory material containing SiALON/SiC and carbon includes heating a molding containing silicon, aluminum, aluminum oxide, and carbon to a temperature of 1500° C. at a total atmospheric pressure of less than or equal to 0.1 MPa in an atmosphere containing predominantly nitrogen and containing a concentration of 10 to 30 vol. % of carbon monoxide; and subsequently controlling the concentration of carbon monoxide to be between 20 and 50 vol. % and heating the molding to a temperature of 2200° C. at a total atmospheric pressure of greater than or equal to 0.1 MPa.

20 Claims, No Drawings

PROCESS FOR PRODUCING REFRACTORY MATERIALS

CONTINUING APPLICATION DATA

This application is a Continuation-In-Part application of International Application No. PCT/EP94/03019, filed on Sep. 9, 1994, which claims priority from German Patent Application No. P 43 30 584.9, filed on Sep. 9, 1993. International Application No. PCT/EP94/03019 was pending as of the present application and the U.S. was an elected state in International Application No. PCT/EP94/03019.

BACKGROUND OF THE INVENTION

1. Field of the Invention

This invention relates to the fields of ceramics and metallurgy, and to a process for the production of refractorly materials on the basis of a SiAlON/C or SiAlON/SiC/C composite which can also be used as a binder for a refractory filler.

2. Background Information

The decisive performance factors which govern the use of these materials are good corrosion resistance to liquid metals and slags, as well as a high resistance to thermal shocks and thermal fatigue strength.

Refractory materials generally comprise or consist of relatively large-grain fillers and a finer-grain matrix which functions as a binder and which essentially determines the characteristics of the composite. Refractory fillers of the prior art include fire clays, corundum, MgO and SiC.

To improve the corrosion resistance and the thermoelastic characteristics, carbon in the form of graphite or pitch can be added as a binder to the oxidic matrix, e.g. MgO and $Al_2O_3$.

On account of the good corrosion resistance of SiAlOn and BN with respect to liquid metals, materials which contain these components are also used.

For example, German Patent No. 41 09 375 A1 discloses a process for the production of a SiAlON, as well as a compound material which may also contain BN, which can be used for the manufacture of valve plates, casting nozzles or bricks for lining metallurgical vessels such as furnaces, converters or ladles. In the temperature range up to 1600° C., with sufficient hold time, a mixture of SiAlON and SiC is formed. The fired moldings have an apparent porosity between 17 and 29%.

For example, European Patent No. 0153000 discloses a separately manufactured SiAlON powder as a matrix for a refractory filler in which a resin is used as the binder.

As disclosed in European Patent No. 0242849, a carbon-bonded refractory body is manufactured from a mixture of carbon, SiAlON powder, SiC, $SiO_2$, Si, corundum or other refractory materials, and a material containing boron, such as boron oxide, as an additive which promotes sintering.

European Patent No. 0482984 discloses a broad range of SiAlON/graphite materials with all sorts of different additives, in which the SiAlON phase is manufactured by direct nitration under nitrogen from a mixture of silicon, aluminum and aluminum oxide powder.

But it is known from experimental results and from thermodynamics that the resistance to corrosive media and the behavior of the boundary layer, in particular in contact with carbon, are a function of the type of SiAlON phase.

The complete conversion to a SiAlON of the form $Si_{6-z}Al_zO_zN_{8-z}$ with $z=2 \ldots 3$ therefore requires the presence of defined reaction conditions.

Nitration under nitrogen, as disclosed in European Patent No. 0482984, has the disadvantage that a reaction-dependent porosity results from the reaction of the carbon with the oxide or nitride phases.

OBJECT OF THE INVENTION

An object of the invention is to create a process for the production of refractory materials in which the increase in porosity as a result of the reaction of the carbon with the oxide or nitride phases in the material is prevented.

Another object of the invention is to create a process for the production of refractory materials in which the increase in porosity as a result of the reaction of the carbon with the oxide or nitride phases in the material is minimized.

Yet another object of the invention is to create a process for the production of refractory materials in which the increase in porosity as a result of the reaction of the carbon with the oxide or nitride phases in the material is reduced.

SUMMARY OF THE INVENTION

Using the process in accordance with the invention, refractory materials are produced which contain SiAlON and carbon or SiAlON/SiC and carbon.

To manufacture a refractory material with SiAlON and carbon, a mixture which contains silicon, aluminum, aluminum oxide and carbon is first pressed into moldings, and is then heated to maximum temperatures of 2200° C. in an atmosphere which contains predominantly nitrogen.

The heating process is thereby divided into stages. In the first stage, at a temperature of 1380° C., a total atmospheric pressure of less than or equal to 0.1 MPa is established with a concentration of 0 to 5 vol. % carbon monoxide in the atmosphere. The first stage is followed by a second stage in which, at a temperature of up to 1500° C. and a total atmosphere pressure of less than or equal to 0.1 MPa, the carbon monoxide concentration in the atmosphere is increased to 10 to 30 vol. %. In the subsequent third stage, at a temperature of up to a maximum of 2200° C. and a total atmospheric pressure of greater than or equal to 0.1 MPa, a carbon monoxide concentration of 0 to 10 vol. % is established in the atmosphere.

To produce a refractory material which contains SiAlON/SiC and carbon, in which the mixture can also contain silicon carbide, the mixture is first pressed into moldings and then heated in an atmosphere containing primarily nitrogen up to temperatures of a maximum 2200° C. Here, too, the heating process is divided into stages. In the first stage, at a temperature of up to 1500° C., a total atmospheric pressure of less than or equal to 0.1 MPa is established with a concentration of 10 to 30 vol. % carbon monoxide in the atmosphere. Then, in the next stage, at a temperature up to a maximum of 2200° C. and a total atmospheric pressure of greater than or equal to 0.1 MPa, a carbon monoxide concentration of 20 to 50 vol. % in the atmosphere is established.

Gamma-$Al_2O_3$ or kaolin is preferably used as the aluminum oxide.

It is also advantageous that, for the production of a refractory material which contains SiAlON and carbon in the temperature range from 1380° to 1500° C., a carbon monoxide concentration of 10 to 20 vol. % is established in the atmosphere.

It is also advantageous if, for the production of a refractory material which contains SiAlON and carbon in the temperature range of 1500° to 2200° C. in accordance with the invention, a total atmospheric pressure of greater than or equal to 1 MPa and a carbon monoxide concentration in the atmosphere of 5 vol. % are established.

It is also advantageous if the carbon monoxide is added to the atmosphere externally. That means that the carbon monoxide is added externally of the treatment chamber before the gas enters the chamber.

In an additional advantageous variant of the process, the moldings or castings are embedded in a SiAlON/aluminum oxide/graphite powder mixture.

Carbon is advantageously used in the form of graphite or carbon black.

Using the process claimed by the invention, refractory materials are produced which comprise or consist of a refractory filler material and/or only of the SiAlON matrix and carbon, or SiAlON/SiC and carbon.

The composition of the Si, Al, $Al_2O_3$ powder mixture as the actual binder phase for the carbon and/or the refractory filler corresponds to the molar composition of the $Si_{6-z}Al_zO_zN_{8-z}$ (Beta') with the desired value of z.

On the basis of thermodynamic calculations and experimental investigations, the process has been analyzed in terms of the process and materials, and conditions have thereby been derived which make possible the efficient and reproducible production of composites containing SiAlON and carbon or SiAlON/SiC and carbon.

The invention teaches that the object indicated above can be accomplished by maintaining defined partial pressures, since otherwise it is not possible to achieve the desired phases, or to guarantee their stability, in addition to the fact that secondary reactions can result in shifts in the concentration within the equilibrium phase diagram. The realization of the process requires that the thermal process be divided into stages.

The $Si_3N4$ which is formed by direct nitration up to 1500° C. is not completely converted into the Beta'-SiAlON after this treatment. Nor does an extension of the hold time as recommended by the prior art documents result in a complete conversion. The length of this extension is also limited by the secondary reactions which occur (formation of SiC and loss of C), and which are reflected in an apparent reduction of the degree of reaction (loss of mass).

For this reason, a third stage has been introduced, in which the temperature is increased up to a maximum of 2200° C., the total atmospheric pressure is increased to greater than or equal to 0.1 MPa, and the carbon monoxide concentration in the atmosphere is limited to 0-10 vol. %.

Under these conditions, by introducing a hold time, the complete conversion to Beta'-SiAlON can also be realized at lower temperatures.

The degree of conversion is also a function of the modification of the raw materials used.

Gamma-$Al_2O_3$ or an aluminosilicate, e.g. kaolin, is advantageously used as aluminum oxide.

It is also advantageous to use graphite which is as chemically inactive as possible.

When aluminosilicates are used as the source for silicon and aluminum, it is advantageous to use a reactive carbon, to initiate the carbothermal reduction at the lowest possible temperatures.

The formation of silicon carbide is a function of the reactivity of the carbon added.

To avoid promoting the reactions which form SiC in the nitration stage, it is advantageous to increase the CO partial pressure only starting at 1380° C., i.e. after the end of the nitration process.

The increased total atmospheric pressure in Stage 3 shifts the equilibrium of the reaction $3SiC+2N_2 \leftarrow \rightarrow Si_3N_4+3CO$ in favor of the formation of $Si_3N_4$, which increases the yield of Beta'-SiAlON.

With increasing total atmospheric pressure, at a uniform. $P_{N2}/P_{CO}$ ratio, the SiC proportion decreases, on account of the reaction described by the above equation.

Additions to SiC to expand the SiAlON/carbon composite to an SiAlON/SiC/carbon composite remain stable during nitration up to 1500° C. Only when the $N_2$ pressure is increased and the temperature is increased to more than 1600° C. is SiC converted into $Si_3N_4$ or oxinitride as indicated by the above equation. To obtain the SiC at a total atmospheric pressure of greater than or equal to 0.1 MPa, a carbon monoxide concentration of 20-50 vol. % must preferably or alternatively be established in the third stage.

The increase of the carbon monoxide concentration can advantageously be brought about by an external addition of carbon monoxide to the process, or by using the carbothermal reduction by self-generation. The SiAlON concentration can thereby be increased, even at relatively low temperatures, and the proportion of Beta'-SiAlON with z-values greater than or equal to 2 can be increased.

When the partial pressure ratios claimed by the invention are maintained, a composite consisting of Beta'-SiAlON and carbon or Beta'-SiAlON/SiC and carbon is produced, which can be adapted to meet the requirements of various applications when used together with a refractory filler such as corundum. Such applications include the complex stresses resulting from exposure to liquid steel and slags, which requires a corrosion-resistant, low-porosity material which is resistant to thermal shocks.

DESCRIPTION OF THE PREFERRED EMBODIMENTS

The mixtures of silicon, aluminum, aluminum oxide and/or kaolin indicated in Table 1 have been ground in ethanol for 5 hours in a planetary ball mill under alcohol, with the addition of 5% silicon resin as a granulation and molding additive. The graphite was added toward the end of the grinding to homogenize the mixture. Following drying and granulation of the powder mixture, specimens were molded which, after curing, were nitrated under argon and sintered. The phases were identified using a quantitative method and X-rays.

TABLE 1

| | A | B | C | D | E |
|---|---|---|---|---|---|
| | | | Concentrations in wt. % | | |
| Examples | A3G | G3G | A3Gc | A3GSiC | A3GK |
| Silicon | 42.9 | 49.2 | 39.2 | 26.4 | 10 |
| Aluminum | 4.4 | 4.4 | 4.4 | 2.7 | 3.5 |
| Alpha-$Al_2O_3$ | 25.5 | — | 20.0 | 15.6 | 56.5 |
| Gamma-$Al_2O_3$ | — | 25.5 | — | — | — |
| Kaolin | — | — | 14.4 | — | — |
| Silicon carbide | — | — | — | 33.8 | — |
| Graphite | 27.2 | 27.2 | 19.0 | 21.5 | 30 |
| Carbon black | — | — | 3.0 | — | — |

+5% silicon resin as granulation and molding additive

TABLE 2

Results of diffractometric tests on SiAlON/C, SiAlON/corundum/C and SiAlON/SiC/C composites after reaction sintering, not taking into consideration the free carbon; the proportion of crystal ceramic phases was set equal to 100%. The C-analysis was performed using the hot gas extraction method.

| Batch | Technological Conditions | | | | Phase content in % | | | | | | | Porosity |
|---|---|---|---|---|---|---|---|---|---|---|---|---|
| | Temp. (°C.) | Total Press. (MPa) | CO (vol. %) | Σ Time (h) | $Al_2O_3$ | $Si_3N_4$ | SiC | SiAlON (*) | z | $Si_2N_2O$ | Total C | /total. (%) |
| Stage I | 1000–1380 | 0.1 | <5 | 16 | | | | | | | | |
| Stage II | 1380–1500 | 0.1 | 15 | 0.5 | | | | | | | | |
| A | | | | | 32 | 26 | 17 | 25 | 1.0 | — | 18.5 | — |
| B | | | | | 15 | 18 | 9 | 58 | 1.4 | — | 17.0 | — |
| C | | | | | 20 | 35 | 12 | 33 | 1.8 | — | 16.0 | — |
| D | | | | | 14 | 28 | 32 | 15 | 1.0 | 11 | 28.0 | — |
| Stage III | 1600 | 5 | <5 | 5 | | | | | | | | |
| A | | | | | — | — | <5 | 95 | 2.0 | — | 17.6 | 21 |
| B | | | | | — | — | — | 100 | 2.5 | — | 16.0 | 25 |
| C | | | | | — | — | <3 | 97 | 2.3 | — | 13.0 | 24 |
| E | | | | | 55.6 | — | — | 44.4 | 2.5 | — | 28.0 | 15 |
| Stage III D | 1600 | 3 | 40 | 5 | — | — | 25 | 70 | 2.0 | 5 | 22.0 | 23 |

(*): $Si_{6-z}Al_zO_zN_{8-z}$

The disclosure now turns to an additional embodiment of the present invention.

To manufacture a refractory material with SiAlON and carbon, a mixture which contains silicon, aluminum, aluminum oxide and carbon is first pressed into moldings, and is then heated to maximum temperatures of about 2200° C. in an atmosphere which contains predominantly nitrogen.

The heating process is thereby divided into stages. In the first stage, at a temperature of about 1380° C., a total atmospheric pressure of less than or equal to about 0.1 MPa is established with a concentration of about 0 to about 5 vol. % carbon monoxide in the atmosphere. The first stage is followed by a second stage in which, at a temperature of up to about 1500° C. and a total atmosphere pressure of less than or equal to about 0.1 MPa, the carbon monoxide concentration in the atmosphere is increased to about 10 to about 30 vol. %. In the subsequent third stage, at a temperature of up to a maximum of about 2200° C. and a total atmospheric pressure of greater than or equal to about 0.1 MPa, a carbon monoxide concentration of about 0 to about 10 vol. % is established in the atmosphere.

To produce a refractory material which contains SiAlON/SiC and carbon, in which the mixture can also contain silicon carbide, the mixture is first pressed into moldings and then heated in an atmosphere containing primarily nitrogen up to temperatures of a maximum of about 2200° C. Here, too, the heating process is divided into stages. In the first stage, at a temperature of up to about 1500° C., a total atmospheric pressure of less than or equal to about 0.1 MPa is established with a concentration of about 10 to about 30 vol. % carbon monoxide in the atmosphere. Then, in the next stage, at a temperature up to a maximum of about 2200° C. and a total atmospheric pressure of greater than or equal to about 0.1 MPa, a carbon monoxide concentration of about 20 to about 50 vol. % in the atmosphere is established.

Gamma-$Al_2O_3$ or kaolin is preferably used as the aluminum oxide.

It is also advantageous that, for the production of a refractory material which contains SiAlON and carbon in the temperature range from about 1380° to about 1500° C., a carbon monoxide concentration of about 10 to about 20 vol. % is established in the atmosphere.

It is also advantageous if, for the production of a refractory material which contains SiAlON and carbon in the temperature range of about 1500° to about 2200° C. in accordance with the invention, a total atmospheric pressure of greater than or equal to about 1 MPa and a carbon monoxide concentration in the atmosphere of about 5 vol. % are established.

It is also advantageous if the carbon monoxide is added to the atmosphere externally. That means that the carbon monoxide is added externally of the treatment chamber before the gas enters the chamber.

In an additional advantageous variant of the process, the moldings or castings are embedded in a SiAlON/aluminum oxide/graphite powder mixture.

Carbon is advantageously used in the form of graphite or carbon black.

Using the process claimed by the invention, refractory, materials are produced which comprise or consist of a refractory filler material and/or only of the SiAlON matrix and carbon, or SiAlON/SiC and carbon.

The composition of the Si, Al, $Al_2O_3$ powder mixture as the actual binder phase for the carbon and/or the refractory filler corresponds to the molar composition of the $Si_{6-z}Al_zO_zN_{8-z}$ (Beta') with the desired value of z.

On the basis of thermodynamic calculations and experimental investigations, the process has been analyzed in terms of the process and materials, and conditions have thereby been derived which make possible the efficient and reproducible production of composites containing SiAlON and carbon or SiAlON/SiC and carbon.

The invention teaches that the object indicated above can be accomplished by maintaining defined partial pressures, since otherwise it is not possible to achieve the desired phases, or to guarantee their stability, in addition to the fact that secondary reactions can result in shifts in the concentration within the equilibrium phase diagram. The realization of the process requires that the thermal process be divided into stages.

The $Si_3N_4$ which is formed by direct nitration up to 1500° C. is not completely converted into the Beta'-SiAlON after this treatment. Nor does an extension of the hold time as recommended by the prior art documents result in a complete conversion. The length of this extension is also limited by the secondary reactions which occur (formation of SiC and loss of C), and which are reflected in an apparent reduction of the degree of reaction (loss of mass).

For this reason, a third stage has been introduced, in which the temperature is increased up to a maximum of 2200° C., the total atmospheric pressure is increased to greater than or equal to about 0.1 MPa, and the carbon monoxide concentration in the atmosphere is limited to about 0–10 vol. %.

Under these conditions, by introducing a hold time, the complete conversion to Beta'-SiAlON can also be realized at lower temperatures.

The degree of conversion is also a function of the modification of the raw materials used.

Gamma-$Al_2O_3$ or an aluminosilicate, e.g. kaolin, is advantageously used as aluminum oxide.

It is also advantageous to use graphite which is as chemically inactive as possible.

When aluminosilicates are used as the source for silicon and aluminum, it is advantageous to use a reactive carbon, to initiate the carbothermal reduction at the lowest possible temperatures.

The formation of silicon carbide is a function of the reactivity of the carbon added.

To avoid promoting the reactions which form SiC in the nitration stage, it is advantageous to increase the CO partial pressure only starting at about 1380° C., i.e. after the end of the nitration process.

The increased total atmospheric pressure in Stage 3 shifts the equilibrium of the reaction $3SiC+2N_2 \leftarrow \rightarrow Si_3N_4+3CO$ in favor of the formation of $Si_3N_4$, which increases the yield of Beta'-SiAlON.

With increasing total atmospheric pressure, at a uniform $P_{N2}/P_{CO}$ ratio, the SiC proportion decreases, on account of the reaction described by the above equation.

Additions to SiC to expand the SiAlON/carbon composite to an SiAlON/SiC/carbon composite remain stable during nitration up to about 1500° C. Only when the $N_2$ pressure is increased and the temperature is increased to more than about 1600° C. is SiC converted into $Si_3N_4$ or oxinitride as indicated by the above equation. To obtain the SiC at a total atmospheric pressure of greater than or equal to about 0.1 MPa, a carbon monoxide concentration of about 20–50 vol. % must preferably or alternatively be established in the third stage.

The increase of the carbon monoxide concentration can advantageously be brought about by an external addition of carbon monoxide to the process, or by using the carbothermal reduction by self-generation. The SiAlON concentration can thereby be increased, even at relatively low temperatures, and the proportion of Beta'-SiAlON with z-values greater than or equal to 2 can be increased.

When the partial pressure ratios claimed by the invention are maintained, a composite consisting of Beta'-SiAlON and carbon or Beta'-SiAlON/SiC and carbon is produced, which can be adapted to meet the requirements of various applications when used together with a refractory filler such as corundum. Such applications include the complex stresses resulting from exposure to liquid steel and slags, which requires a corrosion-resistant, low-porosity material which is resistant to thermal shocks.

Some examples relating to the treatment of SiAlON may be found in U.S. Pat. No. 4,913,936, with an issue date of Apr. 3, 1990, with inventors Pankaj K. Mehotra and Joyce L. Swiokla, entitled Method of surface alloying SiALON articles; and also in U.S. Pat. No. 5,192,720, with an issue date of Jun. 27, 1991, with inventors George T. Hida, Rodica S. Hida, and Cezar C. Delcea, entitled SiALON composition.

Some examples of the phases of SiAlON may be found in U.S. Pat. No. 5,200,374, with an issue date of Apr. 6, 1993, with inventors Tetsuo Yamada, Tetsuo Nakayasu, Atsuhiko Tanaka, Takuji Takahashi, and Yasuhiko Kohtoku, entitled SiAlON-based sintered body and process for producing same; also in U.S. Pat. No. 5,204,297, with an issue date of Apr. 20, 1993, with inventors Takehisa Yamamoto, Takao Nishioka, Kenji Matsunuma, Akira Yamakawa, and Masaya Miyake, entitled Silicon nitride sintered body and process for producing the same; also in U.S. Pat. No. 5,214,009, with an issue date of May 25, 1993, with inventors Michiyasu komatsu, Tsuneji Kameda, and Masahiro Asayama, entitled Sialon containing ceramic sinter; also in U.S. Pat. No. 5,227,346, with an issue date of Jul. 13, 1993, with inventors Chinmau J. Hwang and Donald R. Beaman, entitled Sialon composites and method of preparing the same; also in U.S. Pat. No. 5,238,885, with an issue date of Aug. 24, 1993, with inventors Masahiro Asayama, Michiyasu Komatsu, Tsuneji Kameda, and Akio Sayano, entitled Sialon type sintered bodies and method of producing the same; also in U.S. Pat. No. 5,275,772, with an issue date of Jan. 4, 1994, with inventors Takehisa Yamamoto, Takao Nishioka, Kenji Matsunuma, Akira Yamakawa, and Masaya Miyake, entitled Silicon nitride sintered body and process for producing the same; and also in U.S. Pat. No. 5,316,856, with an issue date of May 31, 1994, with inventors Junichiro Suzuki and Masahide Kayukawa, entitled Silicon nitride base sintered body.

Some examples of SiAlON in a process with Nitrogen may be found in U.S. Pat. No. 5,178,819, with an issue date of Jan. 12, 1993, with inventor Jacques Schoennahl, entitled Tuyere blocks of vertical reactor furnaces; also in U.S. Pat. No. 5,185,300, with an issue date Feb. 9, 1993, with inventors Dale B. Hoggard and Quentin K. Robinson, entitled Erosion, thermal shock and oxidation resistant refractory compositions; and also in U.S. Pat. No. 5,186,386, with an issue date of Mar. 23, 1993, with inventors Yutaka Furuse and Keiji Matsuhiro, entitled Sintered ceramic composite body and method of manfacturing same.

Some examples of Beta-SiAlON may be found in U.S. Pat. No. 5,221,647, with an issue date of Jun. 22, 1993, with inventors George T. Hida and Rodica S. Hida, entitled Sialon precursor composition; and also in U.S. Pat. No. 5,302,329, with an issue date of Apr. 12, 1994, with inventors Tatsuya Shiogai, Yoshitsugu Nishi, and Chitake Yamagishi, entitled Process for producing .beta.-sialon based sintered bodies.

Some examples of SiAlON being treated in the atmosphere may be found in U.S. Pat. No. 5,198,165, with an issue date of Mar. 30, 1993, with inventors Yoshio Akimune and Naoto Hirosaki, entitled Sintered silicon carbide and sialon composite; and also in U.S. Pat. No. 5,296,008, with an issue date of Mar. 22, 1994, with inventors Hideki Moriguchi, Mitsunori Kobayashi, Toshio Nomura, and Tosiaki Nakamata, entitled Method for manufacturing a cutting tool insert made of a silicon nitride body.

An example of $Si_{6-z}Al_zO_zN_{8-z}$ may be found in U.S. Pat. No. 5,212,123, with an issue date of May 18, 1993, with inventor Jacques P. R. Schoennahl, entitled Refractory materials formed from refractory grains bonded by a sialon matrix containing dispersed graphite and/or boron nitride particles and a process for the preparation of these materials.

An example of SiAlON and refractories may be found in U.S. Pat. No. 5,215,947, with an issue date of Jun. 1, 1993, with inventors Jacques P. R. Schoennahl and Daniel Kuster, entitled Refractory parts for devices for regulation or interruption of a jet of steel, made of refractory material.

Some examples of SiAlON with silicon and other compounds in a process may be found in U.S. Pat. No. 5,196,271, with an issue date of Mar. 23, 1993, with inventors Danny R. White, Michael K. Aghajanian, and Harry R. Zwicker, entitled Method of making ceramic articles having channels therein and articles made thereby; also in U.S. Pat. No. 5,204,299, with an issue date of Apr. 20, 1993, with inventors Ratnesh K. Dwivedi and Christopher R. Kennedy, entitled Modified ceramic structures; also in Patent Number 5,212,124, with an issue date of May 18, 1993, with inventor Marc S. Newkirk, entitled Ceramic composite articles with shape replicated surfaces; also in U.S. Pat. No. 5,217,932, with an issue date of Jun. 8, 1993, with inventors Yutaka Furuse and Keiji Matsuhiro, entitled Sintered ceramic composite body and method of manufacturing same; and also in U.S. Pat. No. 5,272,239, with an issue date of Dec. 21, 1993, with inventor James A. Jensen, entitled Silicon-filled aluminum polymer precursors to SiC-AlN ceramics.

One feature of the invention resides broadly in the process for the production of refractory materials containing SiAlOn and carbon or SiAlOn/SiC and carbon, characterized by the fact that for the production of a refractory material containing SiAlON and carbon, a mixture containing silicon, aluminum, aluminum oxide and carbon is first pressed into moldings and is then heated in an atmosphere which contains predominantly nitrogen up to temperatures of a maximum of 2200° C., whereby up to a temperature of 1380° C., a total atmospheric pressure of less than or equal to 0.1 MPa is established with a concentration of 0 to 5 vol. % carbon monoxide in the atmosphere, then up to a temperature of 1500° C. at a total atmospheric pressure of less than or equal to 0.1 MPa the carbon monoxide concentration in the atmosphere is increased to 10 to 30 vol. %, and then up to a temperature of a maximum 2200° C. at a total atmospheric pressure of greater than or equal to 0.1 MPa, a carbon monoxide concentration in the atmosphere of 0 to 10 vol. % is established, and that to produce a refractory material which contains SiAlON/SiC and carbon, the mixture can also contain silicon carbide, and the mixture is first pressed into moldings, and is then heated in an atmosphere which contains predominantly nitrogen up to temperatures of a maximum 2200° C., whereby up to a temperature of 1500° C., a total atmospheric pressure of less than or equal to 0.1 MPa is established with a concentration of 10 to 30 vol. % carbon monoxide in the atmosphere, and then up to a temperature of a maximum 2200° C. at a total atmospheric pressure of greater than or equal to 0.1 MPa, a carbon monoxide concentration in the atmosphere of 20 to 50 vol. % is established.

Another feature of the invention resides broadly in the process characterized by the fact that Gamma-$Al_2O_3$ or kaolin is used as aluminum oxide.

Yet another feature of the invention resides broadly in the process characterized by the fact that to produce a refractory material which contains SiAlON and carbon in the temperature range from 1380° to 1500° C., a carbon monoxide concentration of 10 to 20 vol. % is established in the atmosphere.

Still another feature of the invention resides broadly in the process characterized by the fact that to produce a refractory material which contains SiAlON and carbon in the temperature range from 1500° to 2200° C., a total atmospheric pressure of greater than or equal to 1 MPa and a carbon monoxide concentration of 5 vol. % are established in the atmosphere.

Yet still another feature of the invention resides broadly in the process characterized by the fact that to produce a refractory material which contains SiAlON and carbon in the temperature range from 1500° to 2200° C., a total atmospheric pressure of greater than or equal to 0.1 MPa and a carbon monoxide concentration of 5 vol. % are established in the atmosphere.

A further feature of the invention resides broadly in the process characterized by the fact that the carbon monoxide is added to the atmosphere externally.

Another feature of the invention resides broadly in the process characterized by the fact that the moldings are embedded in an SiAlON/aluminum oxide/graphite powder mixture.

Yet another feature of the invention resides broadly in the process characterized by the fact that graphite or carbon black is used as carbon.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein; are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. A process for producing a refractory material containing SiAlON and carbon, said process comprising:

preparing a mixture comprising components containing silicon, aluminum, aluminum oxide and carbon;

forming a molding with said mixture;

heating said molding to a temperature of about 1380° C. at a total atmospheric pressure of less than or equal to about 0.1 MPa in an atmosphere containing predominantly nitrogen and containing a concentration of about 0 to about 5 vol. % of carbon monoxide;

subsequently increasing the concentration of carbon monoxide in the predominantly nitrogen atmosphere to between about 10 and about 30 vol. % and heating said molding to a temperature of about 1500° C. at a total atmospheric pressure of less than or equal to about 0.1 MPa; and subsequently controlling the concentration of carbon monoxide in the predominantly nitrogen atmosphere to be between about 0 and about 10 vol. % and heating said molding to a temperature of about 2200° C. at a total atmospheric pressure of greater than or equal to about 0.1 MPa.

2. The process according to claim 1 wherein said step of preparing said mixture comprises adding gamma-$Al_2O_3$ or kaolin as the aluminum oxide.

3. The process according to claim 2 wherein said step of subsequently increasing comprises increasing the concentration of carbon monoxide in the atmosphere to between about 10 and about 20 vol. %.

4. The process according to claim 3 wherein said step of subsequently controlling comprises controlling the concentration of carbon monoxide in the atmosphere to be about 5 vol. % at a total atmospheric pressure of greater than or equal to about 1 MPa.

5. The process according to claim 4 comprising performing said process in a treatment chamber and adding carbon monoxide to the atmosphere externally of the treatment chamber.

6. The process according to claim 5 comprising embedding said molding in a SiAlON/aluminum oxide/graphite powder mixture.

7. The process according to claim 6 wherein said step of preparing said mixture comprises adding graphite or carbon black as the carbon.

8. A process for producing a refractory material containing SiAlON/SiC and carbon, said process comprising:
preparing a mixture comprising components containing silicon, aluminum, aluminum oxide, and carbon;
forming a molding with said mixture;
heating said molding to a temperature of about 1500° C. at a total atmospheric pressure of less than or equal to about 0.1 MPa in an atmosphere containing predominantly nitrogen and containing a concentration of about 10 to about 30 vol. % of carbon monoxide; and
subsequently controlling the concentration of carbon monoxide in the predominantly nitrogen atmosphere to be between about 20 and about 50 vol. % and heating said molding to a temperature of about 2200° C. at a total atmospheric pressure of greater than or equal to about 0.1 MPa.

9. The process according to claim 8 wherein said step of preparing said mixture comprises adding silicon carbide.

10. The process according to claim 9 wherein said step of preparing said mixture comprises adding gamma-$Al_2O_3$ or kaolin as the aluminum oxide.

11. The process according to claim 10 comprising performing said process in a treatment chamber and adding carbon monoxide to the atmosphere externally.

12. The process according to claim 11 comprising embedding said molding in a SiAlON/aluminum oxide/graphite powder mixture.

13. The process according to claim 12 wherein said step of preparing said mixture comprises adding graphite or carbon black as the carbon.

14. A process for producing a refractory material containing SiALON and carbon, said process comprising:
preparing a mixture comprising components containing silicon, aluminum, aluminum oxide and carbon;
forming a molding with said mixture;
heating said molding to a temperature of 1380° C. at a total atmospheric pressure of less than or equal to 0.1 MPa in an atmosphere containing predominantly nitrogen and containing a concentration of 0 to 5 vol. % of carbon monoxide;
subsequently increasing the concentration of carbon monoxide in the predominantly nitrogen atmosphere to between 10 and 30 vol. % and heating said molding to a temperature of 1500° C. at a total atmospheric pressure of less than or equal to 0.1 MPa; and
subsequently controlling the concentration of carbon monoxide in the predominantly nitrogen atmosphere to be between 0 and 10 vol. % and heating said molding to a temperature of 2200° C. at a total atmospheric pressure of greeter than or equal to 0.1 MPa.

15. The process according to claim 14 wherein said step of preparing said mixture comprises adding gamma-$Al_2O_3$ or kaolin as the aluminum oxide.

16. The process according to claim 15 wherein said step of subsequently increasing comprises increasing the concentration of carbon monoxide in the atmosphere to between 10 and 20 vol. %.

17. The process according to claim 16 wherein:
said step of subsequently controlling comprises controlling the concentration of carbon monoxide in the atmosphere to be 5 vol. % at a total atmospheric pressure of greater than or equal to 1 MPa;
said step of preparing said mixture comprises adding graphite or carbon black as the carbon;
said process further comprises:
performing said process in a treatment chamber and adding carbon monoxide to the atmosphere externally of the treatment chamber; and
embedding said molding in a SiAlON/aluminum oxide/ graphite powder mixture.

18. A process for producing a refractory material containing SiAlON/SiC and carbon, said process comprising:
preparing a mixture comprising components containing silicon, aluminum, aluminum oxide, carbon and silicon carbide;
forming a molding with said mixture;
heating said molding to a temperature of 1500° C. at a total atmospheric pressure of less than or equal to 0.1 MPa in an atmosphere containing predominantly nitrogen and containing a concentration of 10 to 30 vol. % of carbon monoxide; and
subsequently controlling the concentration of carbon monoxide in the predominantly nitrogen atmosphere to be between 20 and 50 vol. % and heating said molding to a temperature of 2200° C. at a total atmospheric pressure of greater than or equal to 0.1 MPa.

19. The process according to claim 18 wherein said step of preparing said mixture comprises adding gamma-$Al_2O_3$ or kaolin as the aluminum oxide.

20. The process according to claim 19 wherein:
said step of preparing said mixture comprises adding graphite or carbon black as the carbon;
said method further comprises:
performing said process in a treatment chamber and adding carbon monoxide to the atmosphere externally; and
embedding said molding in a SiAlON/aluminum oxide/ graphite powder mixture.

* * * * *

UNITED STATES PATENT AND TRADEMARK OFFICE
CERTIFICATE OF CORRECTION

PATENT NO.   : 5,718,866
DATED        : February 17, 1998
INVENTOR(S)  : Hans-Jürgen RICHTER, Reiner SCHOBER, Gerhard PUTZKY, and Gert KÖNIG It is certified that error appears in the above-identified patent and that said Letters Patent is hereby corrected as shown below:

In column 1, line 17, after 'of', delete "refractorly" and insert --refractory--.

Signed and Sealed this

Thirtieth Day of June, 1998

Attest:

BRUCE LEHMAN

Attesting Officer       Commissioner of Patents and Trademarks